Figure 1:
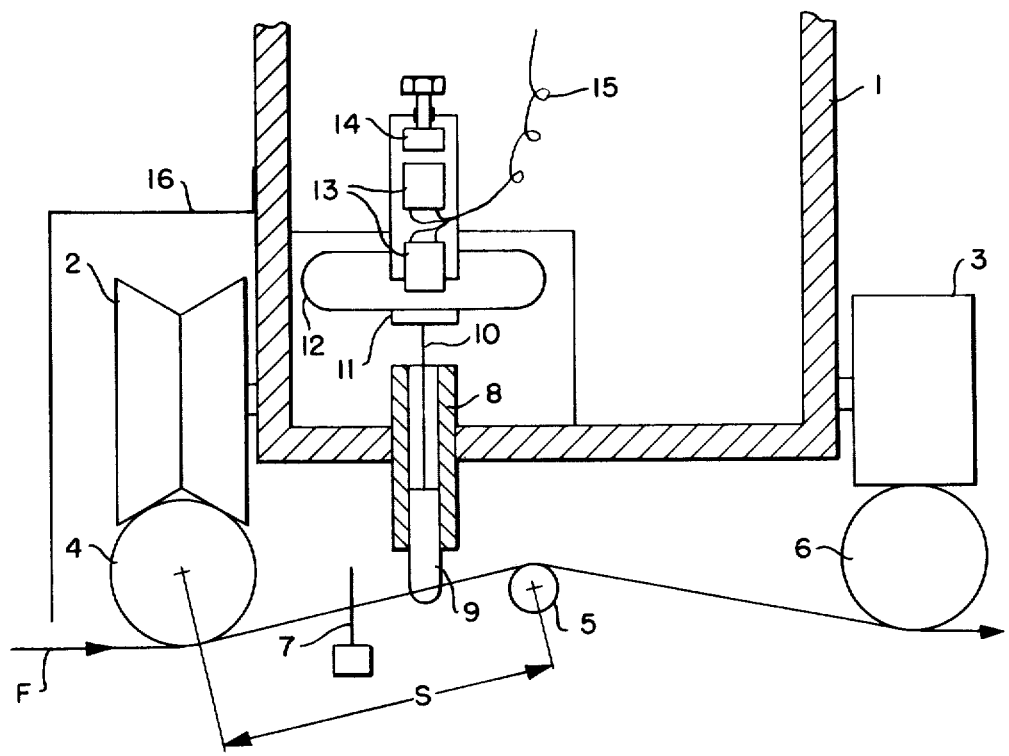

United States Patent [19]

a'Brassard et al.

[11] 4,378,704

[45] Apr. 5, 1983

[54] PROCESS AND DEVICE TO IDENTIFY DIFFERENCES IN YARN TENSION

[75] Inventors: Hans-Joachim a'Brassard; Robert Kloss; Paul Ketzler; Johannes Wolz, all of Heinsberg, Fed. Rep. of Germany

[73] Assignee: Akzona, Incorporated, Asheville, N.C.

[21] Appl. No.: 174,745

[22] Filed: Aug. 4, 1980

[51] Int. Cl.³ .............................................. G01L 5/10
[52] U.S. Cl. ............................. 73/862.07; 73/862.45; 73/862.48
[58] Field of Search ........... 73/862.07, 862.45, 862.47, 73/862.48, 159, 160

[56] References Cited

U.S. PATENT DOCUMENTS

| 2,159,969 | 5/1939 | Fürst | 73/862.47 |
| 3,343,410 | 9/1967 | Cashore | 73/862.47 X |
| 3,353,244 | 11/1967 | Newcome | 73/159 X |
| 4,182,169 | 1/1980 | Bardy | 73/862.45 X |

Primary Examiner—Charles A. Ruehl
Attorney, Agent, or Firm—Antonelli, Terry & Wands

[57] ABSTRACT

A process and a device for detection of differences in yarn tension in a sheet of parallel yarn ends wherein the individual ends of the yarn sheet are deflected from a defined measuring plane, the extent of the deflection being measured.

13 Claims, 4 Drawing Figures

PROCESS AND DEVICE TO IDENTIFY DIFFERENCES IN YARN TENSION

The invention relates to a process to identify differences in yarn tension in an orderly sheet of yarn ends on textile machines, especially creels or warpers whereby individual threads in the measuring range are equidistant from each other, and to a device to carry out the process.

It is known that in spite of every effort to design devices to maintain yarn tensile forces of individual threads in an array of threads at a uniform and identical level, it has not been possible to avoid in an array of threads those threads which compared to other threads in the yarn sheet had either too low or too high a tensile force. These threads subsequently are noticeable in dyed knitted or woven goods. Therefore, it is important to detect at an early stage, possibly even prior to winding of the yarn sheet, if individual ends deviate from the general level of tensile force.

Devices to measure yarn tensile forces are known. German Patent disclosure 25 19 653 describes a monitoring device consisting of a lamella resting on the thread. When one thread has a higher tensile force than that of the yarn sheet, said lamella is higher than other lamellae, at lower yarn tensile force it is lower.

German Patent disclosure 2 038 198 describes a device whereby a spring-loaded roller sits on the thread, and the position of the roller which is rotatably bearing-mounted on a lever system is measured and recorded.

Both inventions present the drawback that each end requires an individual device to measure the yarn tension. Moreover, each end must be individually threaded and laid into the device.

The technical objective of the invention should therefore be elimination of these shortcomings by means of a process and a suitable device to carry out the process, by means of which the yarn tension level in a yarn sheet on textile machines is monitored, an increase or decrease in the tension of individual ends in the yarn sheet is identified at an early stage and/or which by adjusting the boundaries of the yarn tension level will permit early corrective action.

This objective is met according to the invention by means of a process as above described characterized in that the entire yarn sheet is deflected under identical conditions for all ends from the general plane into another plane of a length limited in the direction of travel by the measuring zone and is returned after the measuring zone to the general plane, and in that individual ends are deflected in a specific sequence at a predetermined force in the measuring zone from said plane, the extent of deflection being measured and/or recorded and/or used as adjustment factor for regulating and control functions.

The process to identify yarn tension differences is most advantageously characterized in that in the area of the measuring zone each individual end is in turn cyclically deflected out of the plane.

In a preferred evolution of the process of the invention, up to 10 ends per second are deflected out of the measuring zone plane. It has been found most advantageous when 5 to 6 ends per second are deflected out of the plane of the measuring zone.

The measuring zone within which each individual end is in turn cyclically deflected at a predetermined force is advantageously dimensioned to a length of 0.5 to 30 cm. Depending on the strength of the yarn to be deflected, the measuring zone should be selected so that as much as possible for each yarn strength under identical load about the same deflection is produced.

To carry out the process, the invention provides for a device with at least two yarn deflection bars 4,5, characterized in that yarn deflection bars 4,5 serve simultaneously to delineate the measuring zone s, a reed 7 being provided within the measuring zone s; in that in a direction transverse to yarn sheet F is provided a movable measuring carriage 1 equipped with a spring-loaded or otherwise-actuated feeler 9 freely moving along a line essentially or nearly perpendicular to the yarn sheet plane in measuring zone s, the position of said feeler being assessed by an otherwise known measuring device, and in that measuring carriage 1 is connected via flexible cables 15 to relevant switching, recording and power systems.

The force actuating feeler 9, according to the device of the invention, can be either gravity or produced by a spring, preferably a leaf spring 12.

Another advantageous version of the device is characterized in that measuring carriage 1 travels on tracks aligned parallel to the plane of the measuring zone and perpendicularly to the direction of travel of yarn sheet F.

In a further preferred development of this device, measuring carriage 1 is removable to permit insertion of yarn sheet F. As a result, the ends can be threaded without much effort, whereby the device to identify yarn tension differences in an orderly yarn sheet is set on the tracks only after all ends of the yarn sheet have been inserted.

The device to identify yarn tension differences of the invention can advantageously be used in that the tracks on which measuring carriage 1 travels form simultaneously two of at least three yarn deflection bars 4,5,6, located on the same side of the yarn sheet, whereby wheels 2,3 of measuring carriage 1 make contact on the side facing away from yarn sheet F.

In an especially preferred development of this device, the measuring carriage 1 with tracks 4,6 serving simultaneously as yarn deflecting bars can be swiveled aside in a direction transverse to the yarn travel to permit insertion of the ends. As a result, the ends can be inserted without effort, i.e. as if the device to identify yarn tension differences were not present.

Another favorable version is obtained when the tip of feeler 9 assumes the shape of a truncated cone. As a result, feeler 9, which in devices described heretofore had to be lifted before each individual end and lowered onto the end to be measured, can be left in a predetermined starting position. The yarn, which in the area of the slope of the truncated cone at the tip of feeler 9 comes in contact with the feeler as carriage 1 moves across, slides on continuous transverse travel of measuring carriage 1 and simultaneous lifting of the feeler is held for a brief moment in a position corresponding to the yarn tension of the yarn end to be measured.

The tip of feeler 9 is advantageously designed as a flattened hemisphere. As a result, as the yarn makes contact with the feeler, the latter is first quickly lifted, whereas said lifting is steadily less accelerated as the yarn F reaches the flat portion. This eliminates the feeler from overshooting the position corresponding to the yarn tension of the end to be measured.

A device to identify yarn tension differences according to the invention is characterized in that the ratio feeler diameter:distance between two contiguous ends of the yarn sheet is less than or equal to 4. Preferably a ratio of feeler diameter to yarn spacing between 2 and 4 is selected.

An especially favorable version of the device to identify yarn tension differences in an orderly yarn sheet can be obtained in that the measuring device to identify the position of the feeler is an inductive, no-contact motion pickup 11,13,14. The principle of inductive, no-contact motion pickup is described in e.g. "Hengstenberg, Sturm, Winkler, Messen and Regeln in der Chemischen Technik," 2nd Edition, 1964, pp. 1048/1049. The invention will be explained in detail on hand of an example.

Figure 2:
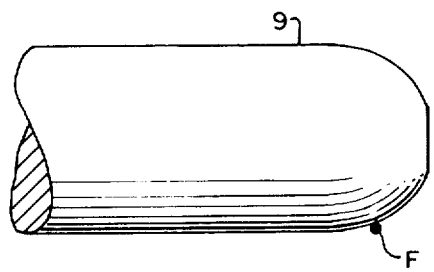
Figure 3:
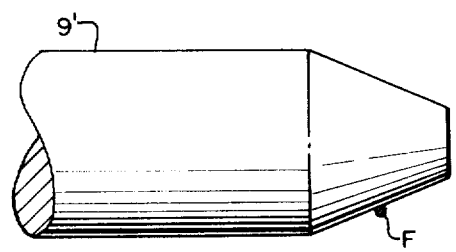
Figure 4:
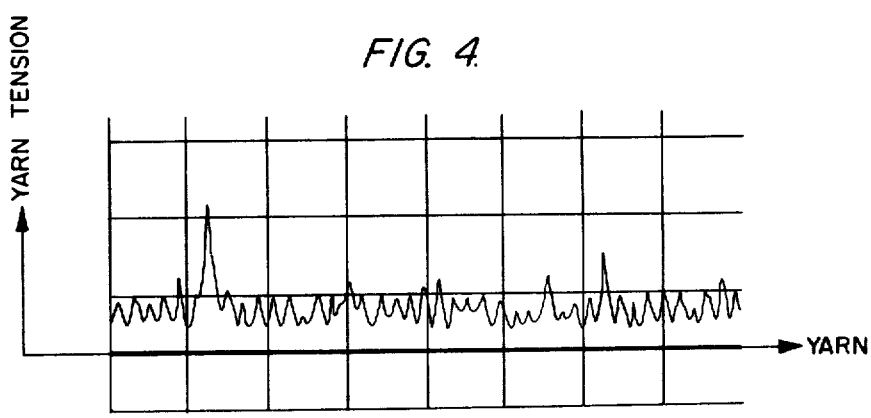

A device to carry out the process is described in the accompanying drawings:

FIG. 1 is a schematic illustration of a device to identify yarn tension differences, FIG. 2 is an embodiment of the tip of the feeler; and FIG. 3 is another version of the tip of the feeler, FIG. 4 is an illustration of a recording tape of a measuring chart made by a yarn sheet measured by the device to identify differences in yarn tension according to the invention.

The device to identify yarn tension differences shown in FIG. 1 comprises a measuring carriage 1, traveling on two guide rolls 2 and by means of drive roll 3, which is connected to a drive motor (not shown). The travel path limitation of the measuring carriage is accomplished by means of known switching elements such as limit switch or "Naeherungsinitiatoren" at the end of the yarn sheet F, whereby the switching element causes reversal of the direction of rotation of the drive motor. Since this is a well-known principle, the two limit switches are not shown. The yarn sheet F travels from yarn deflection bar 4 via yarn deflection bar 5 to yarn deflection bar 6. Simultaneously, yarn deflection bars 4 and 6 act as track for rollers 2 and 3 of measuring carriage 1. Apart from insuring uniform spacing of individual ends of the yarn sheet, reed 7 takes special care that individual ends are not or only insignificantly displaced sideways by feeler 9.

Guide system 8 guides feeler 9 so that the latter moves freely along a line. Feeler 9 is connected via connecting bar 10 and metal plate 11 to leaf spring 12. The starting position of feeler 9 can be adjusted by the suspension of leaf spring 12 (not shown). The inductive, no-contact motion pickup 13 in connection with an adjustable metal plate 14 transmits via flexible cable 15 impulses to a stationary electronic unit, likewise not shown.

Measuring carriage 1 travels by means of its drive motor across yarn sheet F, whereby the starting position of feeler 9 is adjusted in such a manner that contact between the tip of the feeler and the still undeflected end F takes place in the rounded area of the tip. The contact point is shown in FIG. 2. As the carriage advances yarn F cannot be deflected in the direction of travel because of the presence of the reed, and therefore with advancing carriage 1 the feeler is gradually raised resulting in the yarn sliding along the tip of the feeler. When feeler 9 is raised to the point where the force applied by leaf spring 12 on the feeler corresponds to the counteracting force of yarn F versus feeler 9 as result of yarn tension, the yarn glides along the tip of the feeler and the feeler descends again. A pointer needle 16 indicates which of the ends is just being measured.

FIG. 2 shows an enlarged version of the feeler tip of the device to indentify yarn tension differences. The tip is in the shape of a flattened hemisphere. End F is shown in a position assumed at the first point of contact of the yet undeflected end with the tip of feeler 9 in its starting position. FIG. 3 shows a feeler tip 9' with a truncated cone shape.

FIG. 4 shows a recording tape as measuring output of a sheet of yarns F which is obtained with the device to indentify yarn tension differences. Each peak on this tape indicates the yarn tension of one end in the yarn sheet. A peak protruding from the overall level indicates elevated yarn tension, a smaller peak reflects too low a yarn tension versus the overall level. Since the reed insures that the ends are equidistant from each other, the absence of a peak indicates that an end F is missing at that point. Therefore, the device to identify yarn tension differences will also indicate yarn breakage.

The electronic unit (not shown) will stop the yarn sheet winding machine and simultaneously the measuring carriage 1 whenever one end has too high or too low a tension. As a result, pointer needle 16 makes it possible to determine which end is involved.

We claim:

1. A process to identify differences in yarn tension in a traveling sheet of parallel yarn ends on a textile machine, especially a creel or a warper, wherein individual ends in the yarn sheet are equidistant from each other in a measuring zone, characterized in that the entire yarn sheet is deflected under identical conditions for individual ends from a general plane into another plane of a length limited in the direction of travel by the measuring zone and is returned to the general plane after the measuring zone, that individual ends are deflected in a specific sequence at a predetermined force in the measuring zone from said another plane, and that the extent of deflection is measured and used to determine the tension in each successive yarn end whereby operation of the textile machine can be monitored.

2. A process according to claim 1, characterized in that in the measuring zone each yarn end is, in turn, cyclically deflected out of the another plane.

3. A process according to claim 1 or claim 2, characterized in that up to ten ends per second are deflected out of the another plane in the measuring zone.

4. A process according to claim 1 or claim 2, characterized in that the measuring zone is selected to have a length of 0.5 to 30 cm.

5. A device for determining differences in yarn tension in a sheet of parallel yarn ends on a textile machine which comprises at least two yarn deflecting bars, said yarn deflecting bars simultaneously acting to establish a measuring zone; a reed for guiding individual yarn ends in the measuring zone, in a direction transverse to the yarn sheet; a movable measuring carriage equipped with a yarn feeler movable along a line essentially or nearly perpendicular to the yarn sheet plane in the measuring zone, said feeler being biased towards the yarn sheet and having means for contacting the individual yarn ends in sequence to effect deflection of the yarn ends from the yarn sheet plane and the position of the feeler being determined by measuring means; and the measuring means being connected to means for indicating the tension of the individual ends thereby permitting control of the operation of said textile machine.

6. A device according to claim 5, characterized in that the feeler is biased by a leaf spring.

7. A device according to claim 5 or claim 6, characterized in that the carriage has wheels that travel on tracks aligned parallel to the plane of the measuring zone and perpendicular to the direction of travel of the yarn sheet.

8. A device according to claim 7, characterized in that the measuring carriage is removable from the tracks to permit insertion of the yarn sheet.

9. A device according to claim 7, characterized in that the tracks on which measuring carriage travels are simultaneously two of at least three yarn deflecting bars aligned on the same side of the yarn sheet whereby the wheels of the measuring carriage make contact on the side facing away from the yarn sheet.

10. A device according to claim 9, characterized in that the tip of the feeler has a truncated cone shape.

11. A device according to claim 9, characterized in that the tip of the feeler is a flattened hemisphere.

12. A device according to claim 11, characterized in that the ratio of the feeler diameter to the spacing of two adjacent ends in the yarn sheet is smaller than or equal to 4.

13. A device according to claim 12, characterized in that the measuring means to determine the position of the feeler is an inductive, no-contact motion pick-up.

* * * * *